March 15, 1932.  P. C. DUTTON ET AL  1,849,916
MANDREL JOINT
Filed Nov. 22, 1929
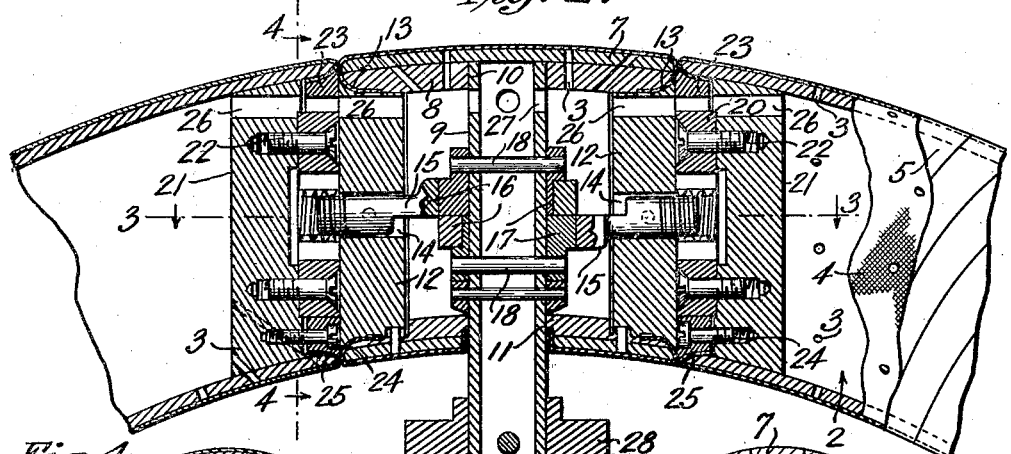
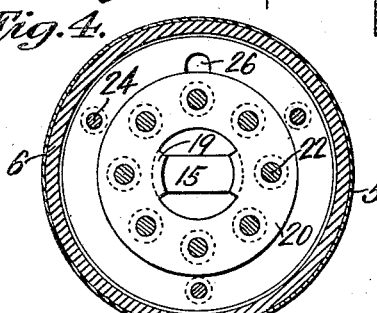
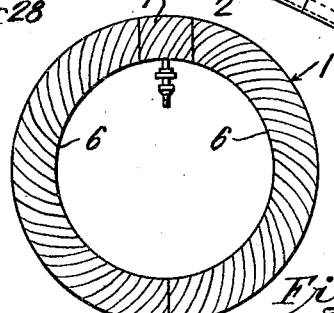
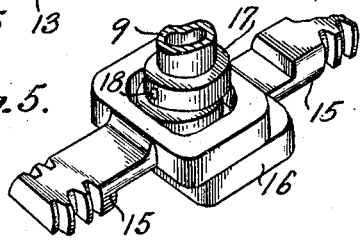
INVENTORS
Eardley Hazell
Percy C. Dutton
ATTORNEY Patented Mar. 15, 1932

1,849,916

UNITED STATES PATENT OFFICE

PERCY C. DUTTON, OF NUTLEY, NEW JERSEY, AND EARDLEY HAZELL, OF NEW YORK, N. Y., ASSIGNORS TO MORGAN & WRIGHT, OF DETROIT, MICHIGAN, A CORPORATION OF MICHIGAN

MANDREL JOINT

Application filed November 22, 1929. Serial No. 409,090.

This invention relates to apparatus for use in the manufacture of endless rubber tubes such as inner tubes.

Inner tubes are usually made by forming a tube having free ends which free ends are spliced together to form a joint and thereby to form an endless tube. Such a joint is objectionable and costly to make.

Rubber tubes may also be formed by depositing the solid constituents of a rubber dispersion upon the exterior surface of a mandrel. An endless rubber tube may be made by depositing rubber upon the exterior surface of a continuous mandrel from a rubber dispersion. Such a mandrel must then be removed from the interior of the tube.

It is the object of this invention to provide a mandrel upon the exterior surface of which a jointless continuous rubber tube may be formed by the deposition of the solid constituents of a rubber dispersion thereon. It is a further object of this invention to provide such a mandrel composed of a plurality of sections adapted to be removed from the interior of the tube through an aperture. A further object of the invention is to provide means for securing the sections of the mandrel together, which is operable while a tube covers the exterior surface of the mandrel. A still further object of the invention is to provide a mandrel composed of sections which may be secured together by a bayonet joint. A still further object of the invention is to provide a mandrel upon which a jointless continuous rubber tube may be formed by the deposition of the solid constituents of a rubber dispersion thereon with the formation of an aperture in the tube during the formation of the tube through which aperture the mandrel may be withdrawn.

Other objects and advantages of the present invention will appear from the following detailed description taken in connection with the accompanying drawings in which:

Fig. 1 is a view in elevation of the mandrel of this invention;

Fig. 2 is an enlarged detail cross sectional view showing the joint construction of the mandrel.

Fig. 3 is a cross sectional detail view taken on line 3—3 of Fig. 2.

Fig. 4 is a cross sectional view taken on line 4—4 of Fig. 2.

Fig. 5 is a perspective detail of the bayonet joint members.

According to the preferred form of this invention, the mandrel 1 is hollow as indicated at 2 and provided with apertures 3 through which the fluid phase of the dispersion may be drawn. Preferably the exterior surface of the mandrel is provided with a knurled surface 4 which facilitates the flow of the serum through the apertures 3 and is covered with a spiral wrap of fabric 5 over the exterior surface of the mandrel to provide a smooth surface which wrap of fabric 5 may be covered by a clay slip if desired. The particular construction of mandrel by virtue of which the deposition of the solid constituents of the rubber dispersion upon the exterior surface thereof is effected is not an essential part of this invention. Other constructions of mandrel which will effect the deposition of the solid constituents of the rubber dispersion on the exterior surface thereof may be employed, for instance a mandrel of absorbent material which will extract the serum and effect the deposition of the solid constituents of the dispersion on the surface thereof may be employed. Or a mandrel having a non-permeable surface coated with coagulating medium which would act to cause the deposition of the rubber upon the surface thereof may be employed, or any other suitable construction of mandrel which will cause the deposition of the solid constituents of the dispersion on the surface thereof may be employed.

In order that the mandrel may be withdrawn from the interior of the rubber tube after it has been formed over the exterior surface thereof, it is necessary that the mandrel be made in at least two sections. As shown in Fig. 1 the mandrel 1 is shown as composed of three sections having two substantially semi-circular sections 6—6 and the relatively short section 7. However, the sections 6—6 may be united into one section and preferably are for the purpose of this invention, although if it is desired the mandrel 1 may be made up of more than three sections. Where a plurality of sections 6—6 are employed, the joint therebetween may be of any suitable construction such as that disclosed in copending application Serial No. 408,945 filed of even date herewith.

While many variations in the details thereof may be made in the preferred form of this invention, the section 7 is provided with a sleeve 8 in which shaft 9 is journaled as indicated at 10 and 11. The sleeve 8 may be secured to the section 7 by force fit or by welding or in any other suitable manner. At the ends of the section 7 disks 12 are fitted into the ends of the sleeve 8 and secured thereto in any other suitable manner as by a force fit. Where the exterior surface of the mandrel is covered with fabric as shown in Fig. 2 the fabric may be secured between the faces of the sleeve 8 and the disks 12 as indicated at 13.

The disks 12 are provided with rectangular openings 14 through which bayonet joint members 15 are slidable but not rotatable. The bayonet joint members 15 are provided with collars 16 in which collars eccentrics 17 rotate. The eccentrics 17 are secured to the shaft 9 by pins 18. Upon rotation of the shaft 9 the eccentrics 17 move the bayonet joint members 15 in and out of the openings 14.

The movement of the bayonet joint members 15 through the openings 14 brings the threaded ends of the members 15 into and out of operative relation with bayonet threads 19 carried by the ring 20. The bayonet joint rings 20 are secured in the ends of the sections 6 of the mandrel as will be described later. As will be apparent from the drawings the end surfaces of the section 7 are plane and parallel, and, in addition, the end surfaces of the sections 6 adjacent the section 7 are parallel to each other and are plane. This construction of sections 6 and 7 with the plane parallel ends is made so that the sections 6 and 7 may be rotated about an axis perpendicular to that radius of the mandrel which passes centrally through the section 7. In the operation of the mechanism the section 7 is inserted between the ends of sections 6 with the bayonet joint members 15 withdrawn into openings 14. The section 7 is inserted between the ends of section 6 in a manner such that the bayonet joint members 15 will be in a position substantially at right angles to that of their engaging position with the threads 19, or in other words the shaft 9 of the section 7 will extend substantially vertically with respect to the plane of the mandrel 1. While the section 7 is maintained in such a position between the ends of the sections 6 the shaft 9 is rotated so as to move the bayonet joint members through the openings 14 and into the projection of the bayonet threads 19. Then the section 7 and all parts carried thereby is rotated to bring the bayonet joint members 15 into engagement with the bayonet threads 19. Such rotation of the section 7 effects a clamping action between the sections 6 and 7 and brings the section 7 into a position such that the surface thereof will be continuous with those of the sections 6 in which position the shaft 9 will extend substantially radially of the mandrel.

In order that the section 7 will be in proper position with regard to the sections 6 when the sections are clamped together, the bayonet joint rings 20 are provided with adjustable mountings. The bayonet joint rings 20 are secured to plugs 21 in any suitable manner by means of screws 22. Plugs 21 are fixed in the ends of section 6 by a force fit or otherwise. As shown in Fig. 4 the rings 20 and plugs 21 are provided with a large number of screws and screw holes so that the rings 20 may be adjusted angularly on the plugs 21 by simply securing the ring and plugs together with the screws and screw holes in any desired position.

In the case of the type of mandrel in which the fabric covering 5 is employed, the fabric at the edge of the ends of the sections 6 may be secured between the face of a washer 23, secured to plug 21 by screws 24, and the adjacent face of the section as indicated at 25. Where the mandrel employed is of the hollow serum extracting type, openings 26 may be provided, in register, in the plugs 21, the washers 23, and the disks 12. The shaft 9 may be made hollow and provided with openings 27 so that fluid may be conducted from the interior of the mandrel through the openings 26, the openings 27, and the hollow shaft to the exterior of the mandrel.

If desired a handle 28 may be provided on the shaft 9 to aid in manipulating it.

In the operation of the device the section 7 is united to the section 6 thereby forming a complete mandrel and the mandrel is then inserted into a rubber dispersion and the deposition of the solid constituents of the dispersion is effected on the exterior surface of the mandrel to form a continuous jointless rubber tube. When the deposition has been completed the tube is then vulcanized or otherwise treated. The section 7 is then freed from the section 6 by manipulating the bayonet joint through the shaft 9 which serves both to rotate the section 7 and to withdraw the bayonet joint members 15. During the formation of the tube upon the mandrel an aperture is formed in the tube around the shaft 9 where it extends from the mandrel. The section 7 is then withdrawn through the aperture formed in the rubber tube and finally the sections 6 are withdrawn from the same aperture. Previous to withdrawing the sections from the tube, air under pressure may be introduced in the mandrel so as to inflate the tube and free it from the surface of the mandrel, if desired.

While the invention has been described in detail by way of illustration, modifications may be made therein, as will be apparent to one skilled in the art, that are within the scope of the invention defined in the following claims.

Having thus described our invention, what we claim and desire to protect by Letters Patent is:

1. A circular mandrel on which rubber tubes may be formed by the deposition of the solid constituents of a rubber dispersion over the exterior surface thereof comprising, at least two segmental sections adapted to interfit in mandrel form, at least one of the sections having parallel plane faces, the faces of the sections juxtaposed to the first mentioned section being plane and parallel, and means including a bayonet joint for securing the first mentioned section to the adjacent sections in mandrel form, said first mentioned section having means for actuating said joint from the exterior of the tube and for forming an aperture in the rubber during the formation of the tube through which aperture the mandrel may be withdrawn.

2. A circular mandrel on which rubber tubes may be formed by the deposition of the solid constituents of a rubber dispersion over the exterior surface thereof comprising, at least two segmental sections adapted to interfit in mandrel form, at least one of the sections having parallel plane faces, the faces of the sections juxtaposed to the first mentioned section being plane and parallel, and means including a bayonet joint at each of the parallel interfaces for securing the first mentioned section to the adjacent sections in mandrel form, said first mentioned section having means for forming an aperture in the rubber during the formation of the tube through which aperture the mandrel may be withdrawn and through which the joint is operated.

3. A circular hollow mandrel on which rubber tubes may be formed by the deposition of the solid constituents of a rubber dispersion over the exterior surface thereof comprising, at least two segmental sections adapted to interfit in mandrel form, at least one of the sections having parallel plane faces, the faces of the sections juxtaposed to the first mentioned section being plane and parallel, and means for securing the first mentioned section and the adjacent sections together in mandrel form, said first mentioned section having means for conducting fluids from the interior of the mandrel.

4. A circular hollow mandrel on which rubber tubes may be formed by the deposition of the solid constituents of a rubber dispersion over the exterior surface thereof comprising, at least two segmental sections adapted to interfit in mandrel form, at least one of the sections having parallel plane faces, the faces of the sections juxtaposed to the first mentioned section being plane and parallel, and means including a bayonet joint for securing the first mentioned section to the adjacent sections in mandrel form, said first mentioned section having means for conducting fluids from the interior of the mandrel.

5. A circular hollow mandrel on which rubber tubes may be formed by the deposition of the solid constituents of a rubber dispersion over the exterior surface thereof comprising, at least two segmental sections adapted to interfit in mandrel form, at least one of the sections having parallel plane faces, the faces of the sections juxtaposed to the first mentioned section being plane and parallel, and means including a bayonet joint at each of the parallel interfaces for securing the first mentioned section to the adjacent sections in mandrel form, said first mentioned section having means for conducting fluids from the interior of the mandrel.

6. A circular hollow mandrel on which rubber tubes may be formed by the deposition of the solid constituents of a rubber dispersion over the exterior surface thereof comprising, at least two segmental sections adapted to interfit in mandrel form, at least one of the sections having parallel plane faces, the faces of the sections juxtaposed to the first mentioned section being plane and parallel, said first mentioned section having means for forming an aperture in the rubber during formation of the tube through which aperture the mandrel may be withdrawn, said first mentioned section having means for conducting fluids from the interior of the mandrel.

7. A circular hollow mandrel on which rubber tubes may be formed by the deposition of the solid constituents of a rubber dispersion over the exterior surface thereof comprising, at least two segmental sections adapted to interfit in mandrel form, at least one of the sections having parallel plane faces, the faces of the sections juxtaposed to the first mentioned section being plane and parallel, and means including a bayonet joint for securing the first mentioned section to the adjacent section in mandrel form, said first mentioned section having means for forming an aperture in the rubber during the formation of the tube through which aperture the mandrel may be withdrawn, and said first mentioned section having means for conducting fluids from the interior of the mandrel.

8. A circular hollow mandrel on which rubber tubes may be formed by the deposition of the solid constituents of a rubber dispersion over the exterior surface thereof comprising, at least two segmental sections adapted to interfit in mandrel form, at least one of the sections having parallel plane faces, the faces of the sections juxtaposed to the first mentioned section being plane and parallel, a tube mounted for rotation in the first mentioned section, bayonet joint members slidably carried by said first mentioned member, bayonet joint means carried by each of the adjacent sections adapted to cooperate with the bayonet joint members, means carried by the tube for moving the bayonet joint members into and out of the projection of the bayonet joint means, said bayonet joint being operable by the rotation of the first mentioned section relative to the adjacent sections.

9. A circular hollow mandrel on which rubber tubes may be formed by the deposition of the solid constituents of a rubber dispersion over the exterior surface thereof comprising, at least two segmental sections adapted to interfit in mandrel form, at least one of the sections having parallel plane faces, the faces of the sections juxtaposed to the first mentioned section being plane and parallel, a tube mounted for rotation in the first mentioned section, bayonet joint members slidably carried by said first mentioned member, bayonet joint means carried by each of the adjacent sections adapted to cooperate with the bayonet joint members, means carried by the tube for moving the bayonet joint members into and out of the projection of the bayonet joint means, said bayonet joint being operable by the rotation of the first mentioned section relative to the adjacent sections, said tube having apertures therein through which fluids may be withdrawn from the interior of the mandrel.

10. A mandrel for forming endless elastic articles by deposition of an elastic material on the surface thereof comprising a mandrel having a plurality of end portions, and means for interlocking said end portion, said interlocking means comprising an element projecting from the mandrel for forming an aperture in the elastic article and for actuating the interlocking means, said aperture serving as a discharge opening for the mandrel.

11. A mandrel for forming endless elastic articles by deposition of an elastic material on the surface thereof comprising a mandrel having a plurality of end portions, and means for interlocking said end portions, said interlocking means comprising a hollow element projecting from the mandrel for forming an aperture in the elastic article, for actuating the interlocking means and for providing a passageway between the interior and the exterior of the mandrel, said aperture serving as a discharge opening for the mandrel.

12. An apparatus for forming inner tubes comprising an incomplete circular mandrel, an interfitting section for completing the mandrel, and means for securing said interfitting section to adjacent mandrel portions comprising an element projecting from said mandrel for forming an aperture in a tube formed thereon.

13. An apparatus for forming inner tubes comprising an incomplete circular mandrel, an interfitting section for completing the mandrel, and means operable by rotation of said section for locking it to said mandrel.

14. An apparatus for forming inner tubes comprising separate mandrel end portions, an interfitting section for completing the mandrel, means operable by rotation of said section relative to said end portions for locking it to said mandrel, and a hollow element projecting from said mandrel and forming an aperture in a tube formed on said mandrel for positioning said locking means to be effective upon said relative rotation, said hollow element serving as a passageway between the interior and exterior of said mandrel.

15. An apparatus for forming inner tubes comprising separate mandrel end portions, an interfitting section for completing the mandrel, means operable by rotation of said section relative to said end portions for locking it to said mandrel, and a hollow element projecting from said mandrel and forming an aperture in a tube formed on said mandrel for positioning said locking means to be effective upon said relative rotation.

Signed at Passaic, county of Passaic, State of New Jersey, this 18th day of November, 1929.

PERCY C. DUTTON.

Signed at Passaic, county of Passaic, State of New Jersey, this 18th day of November, 1929.

EARDLEY HAZELL.